(12) United States Patent
Chung et al.

(10) Patent No.: US 9,952,645 B2
(45) Date of Patent: Apr. 24, 2018

(54) FIRMWARE UPDATE AND POWER SYSTEM THEREOF

(71) Applicant: International Business Machines Corporation, Armonk, NY (US)

(72) Inventors: Hank CH Chung, New Taipei (TW); Lin C. Hsing, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 14/793,919

(22) Filed: Jul. 8, 2015

(65) Prior Publication Data

US 2016/0011887 A1    Jan. 14, 2016

(30) Foreign Application Priority Data

Jul. 9, 2014  (TW) .............................. 103123654 A

(51) Int. Cl.
| | |
|---|---|
| *G06F 1/32* | (2006.01) |
| *G06F 9/445* | (2006.01) |
| *G06F 9/44* | (2006.01) |
| *G06F 1/26* | (2006.01) |

(52) U.S. Cl.
CPC ............ *G06F 1/3212* (2013.01); *G06F 1/266* (2013.01); *G06F 1/3287* (2013.01); *G06F 1/3293* (2013.01); *G06F 8/65* (2013.01); *G06F 8/665* (2013.01); *G06F 9/4416* (2013.01); *Y02B 60/183* (2013.01)

(58) Field of Classification Search
CPC ...... G06F 8/65; G06F 8/61; G06F 8/67; G06F 1/3212; G06F 1/266; G06F 8/665; G06F 9/4416; H02J 2007/005; H02J 7/0047; H02J 2007/0098; H04W 52/0277

See application file for complete search history.

(56) References Cited

U.S. PATENT DOCUMENTS 5,459,671 A  * 10/1995 Duley ................ G01R 31/3648
                                                 320/DIG. 21
6,138,233 A  * 10/2000 Lim .......................... G06F 8/65
                                                          713/1

(Continued)

FOREIGN PATENT DOCUMENTS

JP       2008-071149       *  3/2008  .............. G06F 11/00

OTHER PUBLICATIONS

Bohrer et al., The Case for Power Management in Web Servers, 2002, IBM Research, Austin TX 78758, USA, 2002, pp. 1-31.

*Primary Examiner* — Terrell Johnson
(74) *Attorney, Agent, or Firm* — Lieberman & Brandsdorfer, LLC

(57) ABSTRACT

A firmware update method is provided for use in an information processing system powered by a power system. The power system is powered by an external power source and the power system includes a rechargeable battery and a controller. The method includes checking a power status of the rechargeable battery through the controller in response to a firmware update procedure. A power status of the rechargeable battery is determined to be sufficient to perform the firmware update procedure, and an insufficiency of the external power source to power the power system is determined. Power for the firmware update procedure is limited, through the controller, to the rechargeable battery.

10 Claims, 2 Drawing Sheets

(56) References Cited

U.S. PATENT DOCUMENTS

| | | | |
|---|---|---|---|
| 6,194,870 B1 * | 2/2001 | Kim | G01R 31/3624 320/134 |
| 6,721,580 B1 | 4/2004 | Moon | |
| 7,051,236 B2 | 5/2006 | Sanu | |
| 7,894,783 B2 | 2/2011 | Bulmer | |
| 2003/0229813 A1 | 12/2003 | Shiiyama | |
| 2008/0086652 A1 * | 4/2008 | Krieger | G06F 1/26 713/330 |
| 2010/0213891 A1 * | 8/2010 | Nishikawa | H01M 10/42 320/106 |
| 2012/0007733 A1 | 1/2012 | Cho | |
| 2012/0180034 A1 * | 7/2012 | Hatamoto | G06F 8/65 717/168 |
| 2013/0031382 A1 | 1/2013 | Jau et al. | |
| 2013/0086571 A1 * | 4/2013 | Dasari | G06F 8/665 717/168 |
| 2013/0326495 A1 * | 12/2013 | Reunamaki | G06F 8/65 717/173 |
| 2014/0347005 A1 * | 11/2014 | Zhou | H02J 7/007 320/107 |

* cited by examiner

FIRMWARE UPDATE AND POWER SYSTEM THEREOF

CROSS-REFERENCE TO RELATED APPLICATION(S)

This application claims priority under 35 U.S.C. § 119 from Taiwanese Patent Application No. 103123654, filed on Jul. 9, 2014, the entire contents of which are incorporated by reference herein.

BACKGROUND

Technical Field

The present embodiments generally relate to information processing systems. More specifically, the present embodiments relate to a power system and a method for firmware updates.

Description of the Prior Art

An information processing system (e.g., a server system) usually contains some firmware. The firmware refers to software embedded in hardware components, and is used to initiate the information processing system, perform the necessary work, or facilitate hardware start-ups and implementation in a system. In general, a storage device used for the firmware is a device able to update, such as a non-volatile memory (e.g., Flash Read-Only Memory and Electrically Erasable Read-Only Memory).

One of the solutions to enhance the effectiveness and address unsolved problems for the information processing system is firmware update. The server system includes a variety of devices, such as the Basic Input Output System (BIOS), Integrate Management Module (IMM), and Baseboard Management Controller (BMC), which can be used to adjust functions through firmware updates. The stability and efficiency of the server system can also be adjusted through firmware updates.

Conventional firmware update operations can use, for example, a burner to burn the firmware code to hardware components, and use an update programming tool or download via the Internet to perform firmware updates. In the firmware update process, if there is no stable power supply, the firmware may be damaged, probably causing the system not to boot, abnormal crashes, or other serious consequences. Conventional solutions to the above problem include displaying a warning message to the user, or repeated automatic updates, etc. However, these methods are basically not reliable and sometimes even cause trouble to users.

SUMMARY

The aspects described herein comprise a system and a computer program product for firmware updates, which can enhance reliability and avoid the phenomenon of firmware damage.

According to one aspect, a system is provided. The system includes an information processing system and a power system. The power system is powered by an external power source. The power system includes a rechargeable battery, a controller electrically coupled to the rechargeable battery and the information processing system, and a detecting module electrically coupled between the controller and the external power source. In response to a firmware update procedure for the information processing system, the system performs a method. The method includes the controller to check a power status of the rechargeable battery, and to determine that the power status of the rechargeable battery is sufficient to perform the firmware update procedure. An insufficiency of the external power source to power the power system is determined by the detecting module. Power for the firmware update procedure is limited, through the controller, to the rechargeable battery.

According to another aspect, a computer program product having computer program code is provided to be loaded to and executed on an information handling system for use in an information processing system powered by a power system, the power system being powered by a power source and the power system including a rechargeable battery and a controller, the computer program product comprising a computer-readable storage device having computer readable program code embodied thereon, which when executed causes a computer to implement a method. The method includes checking a power status of the rechargeable battery through the controller in response to a firmware update procedure. A power status of the rechargeable battery is determined to be sufficient to perform the firmware update procedure, and an insufficiency of the external power source to power the power system is determined. Power for the firmware update procedure is limited, through the controller, to the rechargeable battery.

Other features and advantages will become apparent from the following detailed description, taken in conjunction with the accompanying drawings.

BRIEF DESCRIPTION OF THE DRAWINGS

The drawings referenced herein form a part of the specification. Features shown in the drawings are meant as illustrative of only some embodiments, and not of all embodiments unless otherwise explicitly indicated. Implications to the contrary are otherwise not to be made.

DETAILED DESCRIPTION

Figure 1:
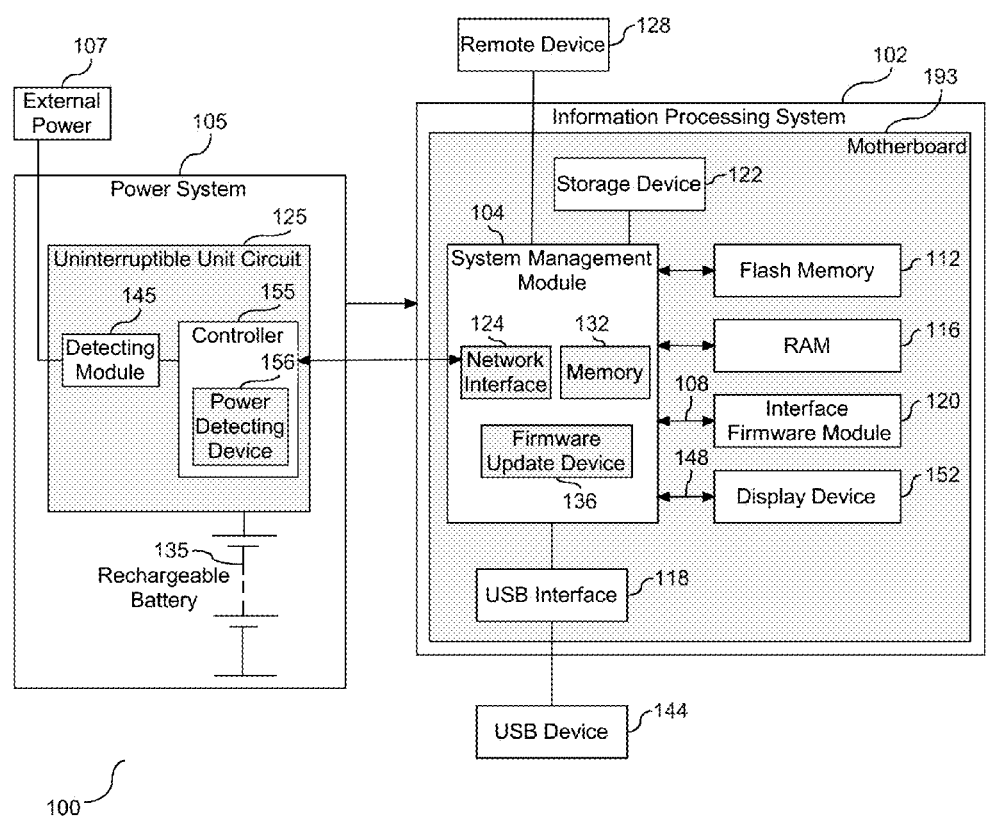
FIG. 1 depicts a functional block diagram of an information processing system and a power supply system according to a preferred embodiment.

It will be readily understood that the components, as generally described and illustrated in the Figures herein, may be arranged and designed in a wide variety of different configurations. Thus, the following detailed description of the embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all of the embodiments.

As will be appreciated by one skilled in the art, the embodiments described herein may be embodied as a computer system/device, a method or a computer program product. Accordingly, the embodiments may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, the embodiments as described herein may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments may be written in any combination of one or more programming languages, including an object oriented programming language such as Java, Smalltalk, C++ or the like, and convention procedural programming languages, such as the "C" programming language or similar programming languages. The program code may execute entirely on the user's computer, partly on the user's computer, as a stand-alone software package, partly on the user's computer, and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The embodiments described below reference flowchart illustrations and/or block diagrams of methods, apparatus (systems), and computer program products. It will be understood that each block of the flowchart illustrations and/or block diagrams, and the combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or another programmable apparatus to produce a computer implemented process such that the instructions which execute on the computer or other programmable apparatus provide processes for implementing the functions/acts specified in the flowchart and/or block diagram block or blocks.

Referring to FIG. 1, a block diagram of an information system (100) according to a preferred embodiment is shown. The information system includes an information processing system (102) and a power system (105). The information processing system (102) includes a system management module (104). The power system (105) may be, for example, an Uninterruptible Power System (UPS) or a Micro UPS, but is not limited thereto. The information processing system (102) also includes a Central Processing Unit (CPU, not shown), a south bridge chip (not shown), a USB interface (118), a storage device (122), and any other component. The relevant components and details will be described hereinafter. Each of the above components can be mounted on a motherboard (193). The architecture shown in FIG. 1 is only shown for illustrative purposes and is only one of many possible architectures.

The system management module (104) may preferably be an Integrated Management Module (IMM), a Baseboard Management Controller (BMC), a Node Manager, an Embedded Controller (EC), or a Management Engine (ME) of the information processing system (102), but is not limited thereto. For the system management module (104), please refer to Renesas' H8S/2117, Altera's EP4CE15F, or Microchip's DSPIC30F, or refer to U.S. Patent Publication No. 2011/0320826 belonging to the same Applicant described above for further modification or extension. In another aspect, a microcontroller can be used as a CPU of the motherboard, which is known to those skilled in the art and will not be described in detail herein.

The firmware in an IMM follows the Intelligent Platform Management Interface (IPMI) standard for system monitoring. In fact, IMM provides system management capabilities through IMPI 2.0 compliance and Serial over LAN (SOL), serves as a common management interface to support cross-product portfolio, and provides server monitoring, alerts, and remote control to achieve a complete on-system management support. Since the IPMI standard is known to those skilled in the art, it will not be described in detail herein. The reference materials of the IPMI specification, such as IPMI 2.0, are available on the following website: http://www.intel.com/design/servers/ipmi/.

For example, using the IMM as the system management module (104), the IMM (104) can be electrically coupled to a flash memory (112), a RAM (116), an interface firmware module (120), etc., through the I/O interface (108). The I/O interface (108), for example, may be a serial peripheral interface (SPI), System Management Bus (SMBUS), and so on. Taking the SPI for example, data can be accessed based on the SPI. The flash memory (112), RAM (116), and interface firmware module (120) are all known to those skilled in the art.

The interface firmware module (120) of the information processing system (102), for example, may be a non-volatile memory chip with the Universal Extensible Firmware Interface (UEFI), Extensible Firmware Interface (EFI), Basic Input/Output System (BIOS), or any other firmware. The interface firmware module (120) can be defined as a module providing a certain interface standard between computer operating systems and computer hardware.

An example of the interface firmware module (120) is a Universal Extensible Firmware Interface (UEFI). The interface defined by the UEFI specification includes tables, such as platform information, running, and boot time service, which can be used in operating system and an operating system loader. UEFI can define the boot service, including various text and graphical console support on the bus, device, archives service, and information segments. Taking the IMM (104) and UEFI (120) for example, the communication between the two is achieved through IPMI commands.

The information processing system (102) may be embedded with different sensors to report to the system management module (104) about the status of information processing system (102) and operational parameters such as temperature, speed of the cooling fan, and various voltages. If the system management module (104) detects any difference between the monitoring parameters and a predetermined limit, it can send an alert to the user or system administrator. Therefore, the system management module (104) may be coupled to a number of hardware components and the Internet to monitor these parameters and activate the alarm when necessary.

The storage device (122) is electrically coupled to the system management module (104). The storage device (122) may be a flash memory, a solid-state hard disk, etc. In addition, the USB interface (118) may be a system management module (104), a south-bridge chip, or a system-on chip (SoC) to perform a service.

In a preferred embodiment, the system management module (104) may comprise a network interface (124) and a memory (132). The network interface (124) may be communicated with a remote device (128). When the system management module (104) boots, the memory (132) may be, for example, a flash memory for loading firmware data from the storage device (122). The network interface (124) may be, for example, but not limited to, a LAN port.

The system management module (104) may comprise a firmware update device (136). In a preferred embodiment, the firmware update device (136) can be modified or extended with reference to U.S. Patent Application Publication No. 2013/0086571, belonging to the same Applicant described above. In a preferred embodiment, the update is made through the network interface (124) by receiving the firmware update commands sent by the remote device (128) via the Internet. In another embodiment, the firmware update commands may be sent by other means or paths, such as Wi-Fi, LAN, etc. The related firmware update procedure is known to those skilled in the art, and thus will not be described in detail herein.

In a preferred embodiment, FIG. 1 further shows a USB device (144) connected to the information processing system (102) through a USB interface (118). When the USB interface (118) is used for system management module (104), firmware update data of the system management module (104) is read from the USB device (144) through the USB interface (118), and then the firmware update device (136) writes the firmware update data being read into the memory (132) of the system management module (104). Then, the firmware update device (136) will clear the original firmware data of the system management module (104) stored in the storage device (122), and copy the firmware update data stored in the memory (132) to the storage device (122).

The firmware update of the system management module (104) is usually performed under the operating system of the information processing system (102) using a specific firmware update software and interface (e.g., data port and address port) on the system management module (104) to write the updated information to the system management module (104). In other embodiments, the firmware update is available by other means or paths, such as USB and IPMI.

In a preferred embodiment, after the system management module (104) is powered and started, the firmware update device (136) can load drivers of the USB device (144) from a storage device (122). The system management module (104) can receive various commands sent by the remote device (128) via the Internet through the network interface (124), such as firmware update commands, system status inquiries, and battery module status inquiries. In terms of firmware update commands, the firmware update of the system management module (104) can be achieved according to the technology described in the preceding paragraph. Furthermore, the firmware update of the interface firmware module (120) can be made using the mechanism and steps similar to the above, and thus the details will not be described herein.

Meanwhile, the system management module (104) can be coupled to a display device (152) through the I/O interface (148), such that the action, environment, and status of the system management module (104) (e.g., firmware update status), and the information processing system (102) being in Normal mode, Safe mode, or other mode, can be perceived by users. The I/O interface (148) may be, for example, a VGA, or a High Definition Multimedia Interface (HDMI). The display device (152) may be, for example, an LCD, a CRT, or any other monitoring device.

The information processing system (102) may be, for example, a server unit, a data processor unit, a switch unit, a router unit, a network equipment unit, or any other computer component unit, but the embodiments described herein are not limited thereto. For example, the fundamental architecture and components of the server unit can be found in the general PC or server, such as IBM's System X, Blade Center, or eServer server. Details irrelevant to the embodiments will be omitted herein.

FIG. 1 shows external power (107), which is electrically coupled to the power system (105). In one embodiment, the power system is a Micro Uninterruptible Power System (Micro UPS). The Micro UPS (105) supplies power to the information processing system (102). The external power (107), for example, can supply power using public electricity network and battery. When the external power (107) provides AC power, the Micro UPS (105) can convert an external AC voltage into a DC voltage. In addition, when DC power is supplied by the external power (107), the external DC voltage can be converted to the appropriate DC voltage for subsequent use.

The Micro UPS (105) may include an uninterruptible power unit circuit (125), a rechargeable battery (135), and a detecting module (145). The rechargeable battery (135) may be, but is not limited to, a rechargeable battery pack. Only two batteries are shown in FIG. 1, but a greater or lesser number of batteries may be arranged in the rechargeable battery (135). The detecting module (145) detects if the external power (107) supplies power to the information processing system (102). The detecting module (145) is connected between the external power (107) and the controller (155). The detecting module (145) should be known to those skilled in the art and will not be described in further detail herein. Generally, the information processing system (102) is powered by the external power (107), while the external power (107) charges the rechargeable battery (135) with a charger (not shown) of the Micro UPS (105). If the external power (107) is powered down, the rechargeable battery (135) is used to supply power to the information processing system (102). In FIG. 1, the Micro UPS (105) converts an AC voltage of the external power (107) into a DC voltage. Also, the uninterruptible power unit circuit (125) includes a controller (155). The Micro UPS (105) further includes a shell (not shown), a power terminal (not shown) that receives power, and so on. Each of the above components is a conventional component known to those skilled in the art, and thus will not be described in detail herein.

When the detecting module (145) detects that the external power (107) supplies power to the information processing system (102) (i.e., the external power (107) is not powered down), the external power (107) supplies power, with the appropriate power conversion, to the information processing system (102). In addition, the aforementioned charger is connected to an output terminal of the external power (107). When the external power (107) sends out electricity, it charges the rechargeable battery (135) via the charger, and stores electricity through the rechargeable battery (135).

When the detecting module (145) detects that the external power (107) does not supply power to the information processing system (102) (i.e., the external power (107) is powered down), the rechargeable battery (135) supplies power to the information processing system (102). In short, when the charger of the uninterruptible power unit circuit (125) stops charging the rechargeable battery (135), the rechargeable battery (135) can be discharged, and the electricity is supplied to the information processing system (102).

The controller (155) may include hardware, software, firmware, or a combination of these, and may include a microcontroller, memory, or any other type of processing element. The controller (155) can be electrically coupled to the system management module (104) (e.g., an IMM through a USB (195) for communication). The USB (195) may use a variety of protocols, such as PMBUS or SMBUS, but it is not limited thereto. Taking the I2C (PMBUS) protocol for example, Serial Clock Line (SCL) and Serial Data Line (SDA) are used to generate the 0/1 differential signal on the bus, and then the signal is sent from the USB (195) to the controller (155) and the IMM (104) for two-way communication. The data transmitted based on the protocol is converted to related commands.

In a preferred embodiment under the I2C communication based architecture, the Micro UPS (105) and the system management module (104) can be communicated in action. Through three I2C pins (data, clock, and alert), the Micro UPS (105) and the system management module (104) can be coupled to each other.

In the embodiment as shown in FIG. 1, the rechargeable battery (135), illustrated in an internal battery pack, is arranged to be placed inside the Micro UPS (105). However, it should be noted that the rechargeable battery (135) may include an external battery pack, such as a portable battery pack. The rechargeable battery (135) may include any type of rechargeable battery pack, such as, but not limited to, nickel metal hydride, lithium ion, nickel-cadmium lithium-ion polymer, or any other type.

Figure 2:
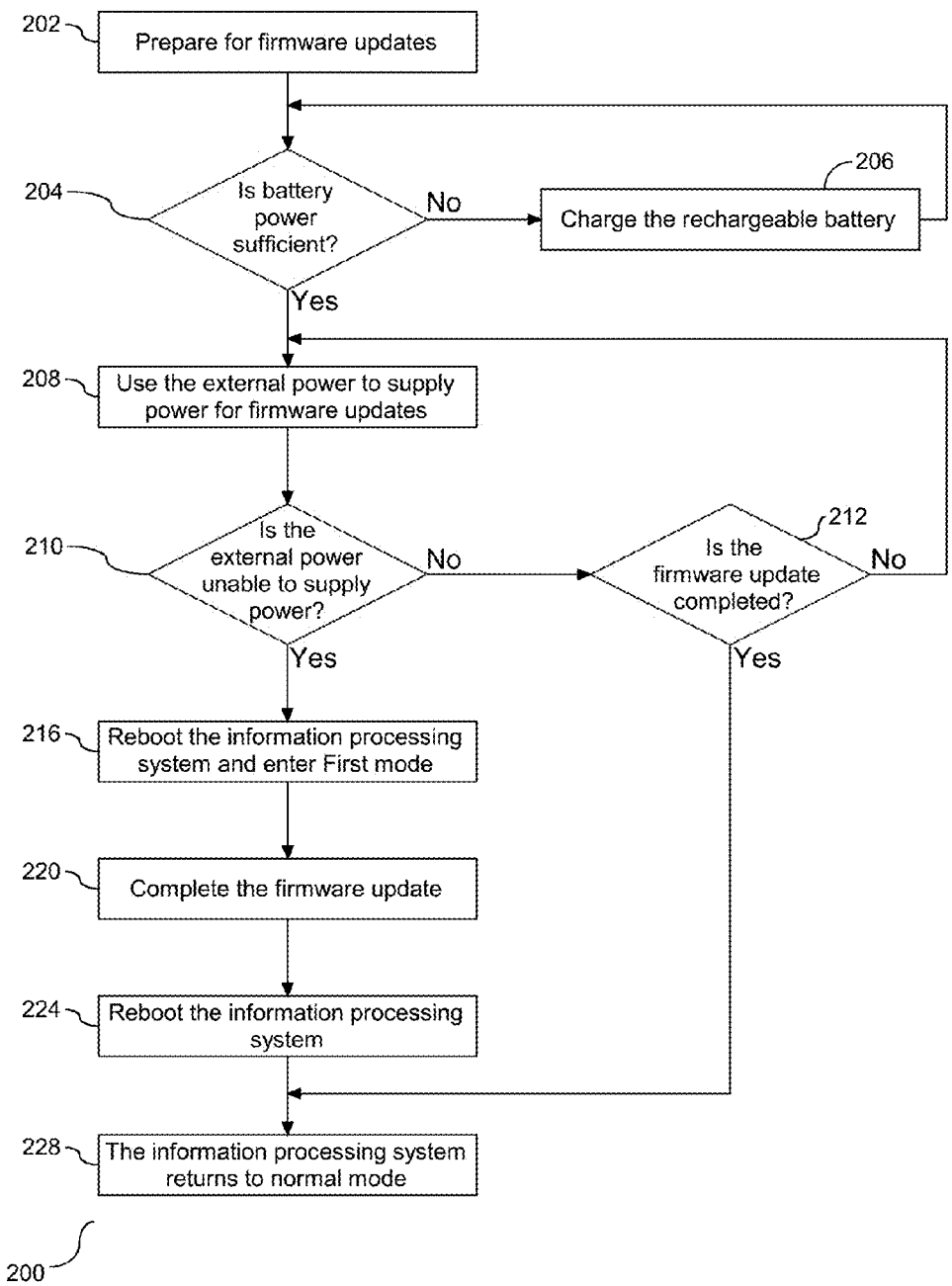
FIG. 2 depicts a flowchart showing a method according to a preferred embodiment.

Hereinafter, a power control method (200) according to one embodiment is described with reference to the hardware architecture as shown in FIG. 1 and a flowchart shown in FIG. 2. In a preferred embodiment, the control method (200) is achieved by the firmware within the memory of the interface firmware module (120).

Step (202): The information processing system (102) is ready for a firmware update.

Step (204): The controller (155) checks if the rechargeable battery (135) has sufficient power supply, such as, but not limited to, checking the health status and the remaining power of the rechargeable battery (135). In a preferred embodiment, the controller (155) uses a power detecting device (156) to detect the power supply status of the rechargeable battery (135). The power detecting device (156) is known to those skilled in the art, and thus will not be described in detail herein. In a preferred embodiment, the power detecting device (156) may be implemented with a firmware of the controller (155), following the IPMI standard for power checking. After the check, if the rechargeable battery (135) has sufficient power supply, the method proceeds to Step (208). If the rechargeable battery (135) does not have sufficient power supply, the method proceeds to Step (206).

Step (206): In response to the power status of the rechargeable battery (135) being insufficient to support the firmware update procedure, the information processing system (102) charges the rechargeable battery (135). In one embodiment, the controller (155) allows a power source to charge the rechargeable battery. In a preferred embodiment, the charging progress percentage can be obtained through a register (not shown) of the power detecting device (156). After charging is completed, the method proceeds back to Step (204), and then repeats the above step in order to check the power supply of the rechargeable battery (135).

Step (208): In response to the power status of the rechargeable battery (135) being sufficient to support the firmware update procedure, the information processing system (102) uses the external power (107) to supply power for the firmware update procedure.

Step (210): For the period of performing the firmware update, the detecting module (145) detects if the external power (107) is not supplying power to the information processing system (102) (i.e., the external power (107) is powered down) or supplies power to the information processing system (102) (i.e., the external power (107) is not powered down). If the external power (107) does not supply power to the information processing system (102), the method proceeds to Step (216). If the external power (107) supplies power to the information processing system (102), the method proceeds to Step (212).

Step (212): In response to the detecting module (145) detecting that the external power (107) supplies power to the information processing system (102) (i.e., the external power (107) is not powered down), the system management module (104) checks if the firmware update is completed. If the firmware update is not completed, the method proceeds back to Step (208) to repeat the firmware update step. If the firmware update is completed, the method proceeds to Step (228).

Step (216): In response to the detecting module (145) detecting that the external power (107) is not supplying power to the information processing system (102) (i.e., the external power (107) is powered down), the information processing system (102) can automatically reboot and enter First mode since the rechargeable battery (135) contains sufficient power. First mode is also called Battery-powered mode or Safe mode, in contrast to Normal mode which is the mode normally operated by the information processing system (102). In Safe mode, the power required by the information processing system (102) is lower than a previous normal operating power. Only the rechargeable battery (135) provides power for the entire power system (105) to continue with the firmware update. It is noted that there is no power supply from the external power (107) in this step.

Step (220): Continue with the update until the firmware update is completed.

Step (224): In response to the firmware update being successfully completed, the information processing system (102) reboots to return to Normal mode after reboot. It should be noted that in certain preferred embodiments, Step (224) can be omitted. At this time, the information processing system (102) is shut down directly.

Step (228): In response to the reboot action, the information processing system (102) returns to Normal mode and uses the power supply by normally operating the power system (105) (i.e., powered by the external power (107) or Micro UPS (105)). Meanwhile, the information processing system (102) re-charges the rechargeable battery (135) for the next use. Then, the steps for the method (200) can be repeated.

As described above, the rechargeable battery (e.g., rechargeable battery pack (135)) is electrically coupled to the controller (155). When the information processing system (102) updates the firmware, the controller (155) checks if the rechargeable battery (135) has sufficient power (e.g., checking battery health and the remaining power). For the firmware update, if the rechargeable battery (135) contains sufficient power, and detects that the external power (107) did not supply power to the information processing system (102) (i.e., the external power (107) is powered down), the information processing system (102) can automatically reboot and enter First mode (e.g., Battery-powered mode or Safe mode). In First mode, the power required by the information processing system (102) is lower than the normal operating power, and only the rechargeable battery (135) provides power to the entire power system (105). After the firmware update is successfully completed, the information processing system (102) can return to normal operation and use the power normally supplied by the power system (105) again. Under normal operation, the information processing system (102) can charge the rechargeable battery (135) for the next use. In addition, for the firmware update, if the power of the rechargeable battery (135) is insufficient to support the firmware update procedure, the information processing system (102) may charge the rechargeable battery (135). When the power of the rechargeable battery (135) is sufficient to support the firmware update procedure, the firmware update is performed. In another preferred embodiment, if the rechargeable battery (135) is malfunctioned, the information processing system (102) can notify the users to replace a new battery with a system warning light; otherwise, the users are not allowed to update the firmware.

Furthermore, the system management module (104) receives a message about there being sufficient power through the controller (155). If there is no sufficient battery power to support the firmware update procedure, the system management module (104) will wait for the rechargeable battery (135) to be fully charged and then perform firmware updates. As mentioned above, if there is insufficient power, the update status and progress can be obtained from the display device (152), and re-charging to complete the firmware update can be informed by the display device (152).

The foregoing preferred embodiments are provided to illustrate and disclose the technical features, and are not intended to be restrictive of the scope of the embodiments described herein. Hence, all equivalent variations or modifications made to the foregoing embodiments without departing from the spirit embodied in the disclosure should fall within the scope as set forth in the claims.

What is claimed is:

1. A system comprising:
an information processing system; and
a power system to power the information processing system, the power system being powered by an external power source having at least a minimal power and a local rechargeable battery;
a controller electrically coupled to the rechargeable battery and the information processing system;
responsive to a firmware update request for the information processing system, an assessment of a power status of the rechargeable battery by the controller;
responsive to the power status of the rechargeable battery being insufficient to perform the update procedure, application of a charge to the rechargeable battery by the controller;
responsive to the power status of the rechargeable battery being sufficient to perform the firmware update and the external power source being insufficient to power the firmware update in a first mode, a reboot of the information processing system in a second mode, the second mode requiring a lower amount of power than the first mode, performance of the update procedure with a combination of the external power source and the rechargeable battery; and
responsive to completion of the update procedure, the information processing system returning to the first mode from the second mode.

2. The system of claim 1, wherein the controller comprises a power detecting device to check the power status of the rechargeable battery.

3. The system of claim 2, wherein the power detecting device includes a register to obtain a charging progress.

4. The system of claim 1, wherein the information processing system comprises a system management module and an interface firmware module, and wherein the firmware update procedure updates at least one of the system management module and the interface firmware module.

5. The system of claim 1, wherein power to perform the firmware update is supplied by the rechargeable battery in response to a threshold being exceeded, and wherein the controller checking the power status of the rechargeable battery includes checking if the power status of the rechargeable battery exceeds the threshold.

6. The system of claim 1, further comprising the reboot of the information processing system in response to completion of the firmware update procedure.

7. The system of claim 6, further comprising the information processing system to enter the second mode in response to the firmware update procedure being completed, wherein the second mode includes the power system supplying power to the information processing system normally.

8. The system of claim 1 further comprising a detection module electrically coupled between the controller and the external power source wherein the detection module determines the external power source has at least a minimal power.

9. A computer program product for use in an information processing system powered by a power system, the power system being powered by an external power source having at least a minimal power and a local rechargeable battery and a controller, the computer program product comprising a non-transitory computer-readable storage device having computer readable program code embodied thereon, which when executed causes a computer to implement a method comprising:

performing an assessment of a power status of the rechargeable battery through the controller in response to a firmware update request;

responsive to the power status of the rechargeable battery being insufficient to perform the firmware update procedure, the controller applying a charge to the rechargeable battery;

responsive to the power status of the rechargeable battery being sufficient to perform the firmware update and the external power source being insufficient to power the firmware update in a first mode, a reboot of the information processing system in a second mode, the second mode requiring a lower amount of power than the first mode, performing the update procedure with a combination of the external power source and the rechargeable battery; and responsive to completion of the update procedure, the information processing system returning to the first mode from the second mode.

10. The computer program product of claim 9, further comprising supplying the power to perform the update by the rechargeable battery in response to a threshold being exceeded, and wherein checking the power status of the rechargeable battery includes checking if the power status of the rechargeable battery exceeds the threshold.

\* \* \* \* \*